United States Patent [19]
Petilli

[11] Patent Number: 6,151,071
[45] Date of Patent: Nov. 21, 2000

[54] CIRCUIT FOR GENERATING CONTROL SIGNALS

[75] Inventor: Eugene M. Petilli, Penfield, N.Y.

[73] Assignee: Eastman Kodak Company, Rochester, N.Y.

[21] Appl. No.: 08/608,904

[22] Filed: Feb. 29, 1996

[51] Int. Cl.[7] .................................................. H04N 5/335
[52] U.S. Cl. ........................................ 348/312; 348/518
[58] Field of Search .................................... 348/207, 312, 348/311, 522, 536, 537, 65, 74, 518, 519, 500, 525; 327/90, 91, 94, 96; H04N 5/335

[56] References Cited

U.S. PATENT DOCUMENTS

| | | |
|---|---|---|
| 4,287,441 | 9/1981 | Smith . |
| 4,831,444 | 5/1989 | Kato ........................................ 348/518 |
| 5,010,408 | 4/1991 | Toohey . |
| 5,086,344 | 2/1992 | D'Luna et al. . |
| 5,124,796 | 6/1992 | Maki ........................................ 348/312 |
| 5,144,444 | 9/1992 | MacLean . |
| 5,202,586 | 4/1993 | Hori et al. . |
| 5,299,032 | 3/1994 | Kurita . |
| 5,321,315 | 6/1994 | Kannegundla . |

FOREIGN PATENT DOCUMENTS

| | | | |
|---|---|---|---|
| 0 395 142 A1 | 10/1990 | European Pat. Off. | ........ G11C 19/28 |
| 0 579 838 A1 | 1/1994 | European Pat. Off. | ........ H04N 17/00 |
| 0 633 691 A2 | 1/1995 | European Pat. Off. | ........ H04N 5/217 |
| 0 684 731 A1 | 11/1995 | European Pat. Off. | ........ H04N 5/217 |

*Primary Examiner*—Tuan Ho
*Attorney, Agent, or Firm*—James D. Leimbach

[57] ABSTRACT

A method and apparatus of correlated double sampling is disclosed by creating sampled and clamped signals from CCD imager outputs that are in phase with the CCD imager outputs comprising: providing an image sensor having an analog output; sensing the output of the image sensor via system electronics; identifying and extracting portions of a reset signal within the analog output signal; and modifying existing clocks in response to extracted portions of the reset signal.

15 Claims, 3 Drawing Sheets

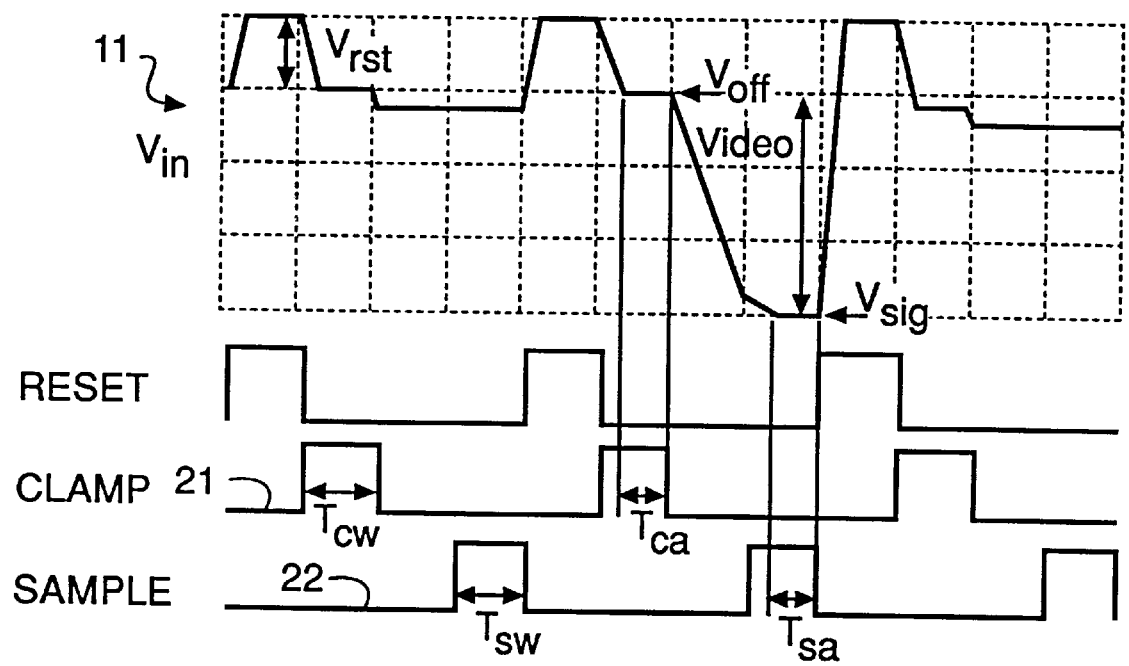
FIG. 1 *(PRIOR ART)*
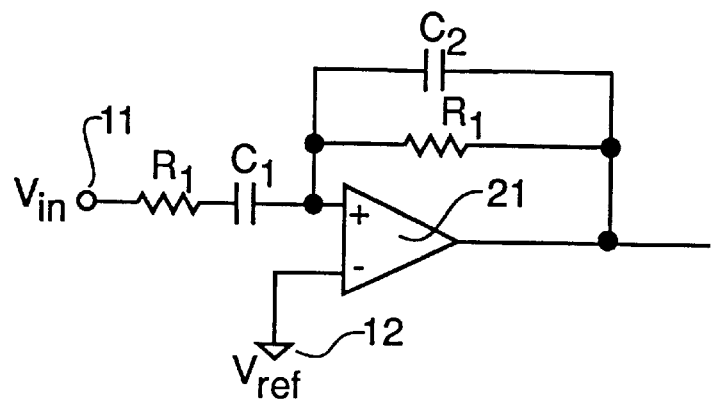
FIG. 2

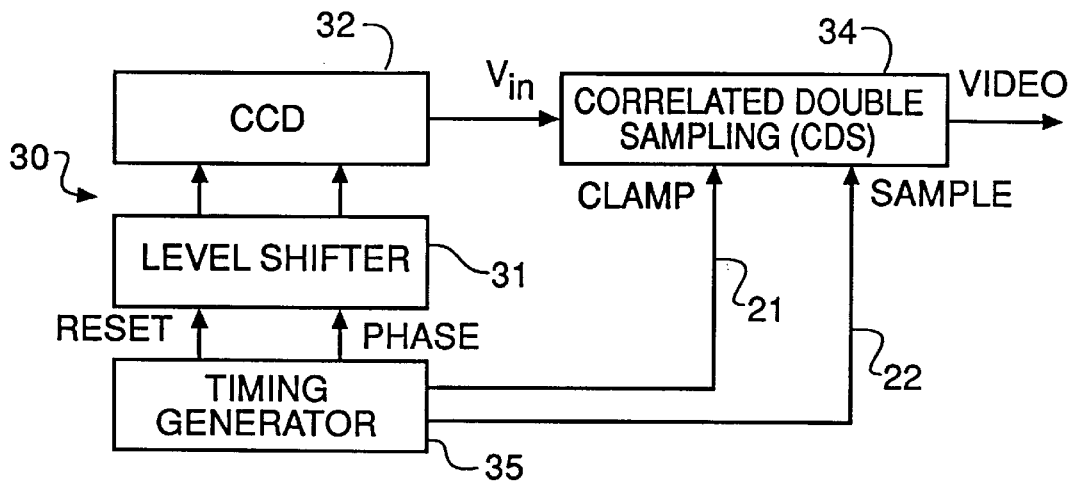
FIG. 3 *(PRIOR ART)*
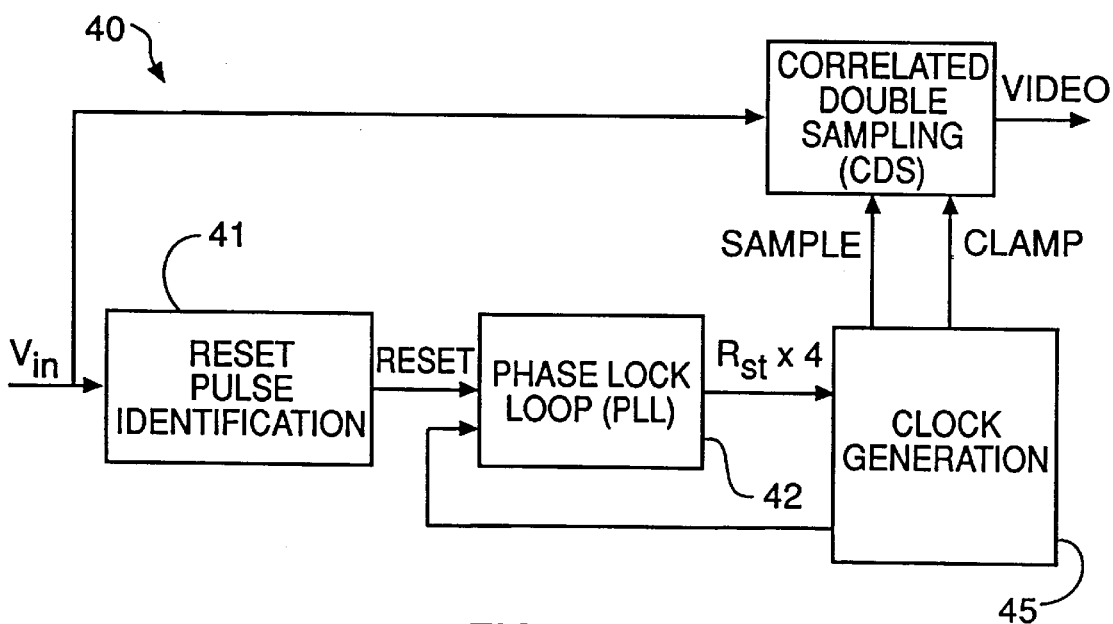
FIG. 4

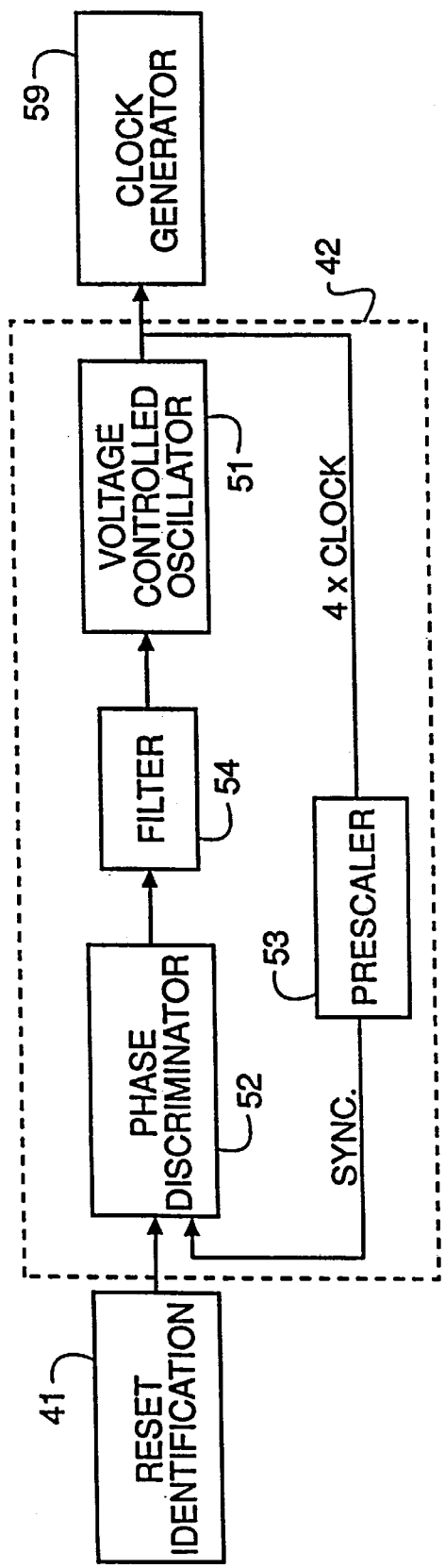
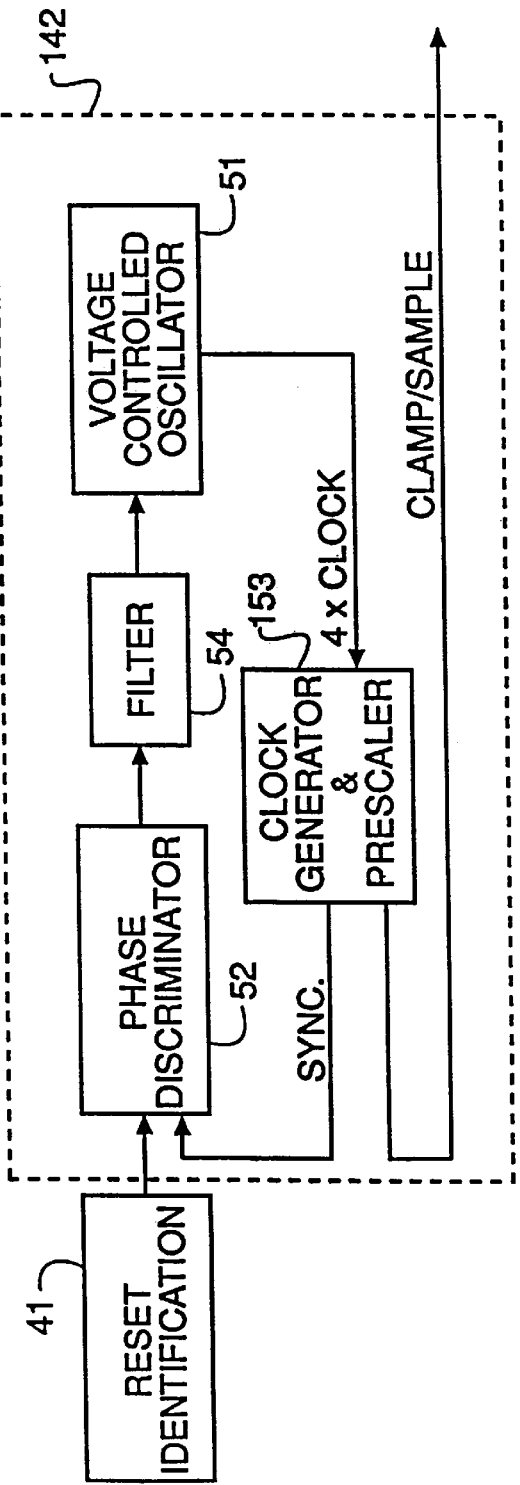

CIRCUIT FOR GENERATING CONTROL SIGNALS

FIELD OF INVENTION

The invention relates generally to the field of imaging devices, and more particularly to the synthesis of sample and hold clocks used in correlated double sampling circuits.

BACKGROUND OF THE INVENTION

Semiconductor based imaging has become predominate for conversion of pictorial information into electronic data. Typically, charge coupled devices, CMOS based imagers, and other semiconductor based imagers are used in camcorders, still electronic cameras, fax machines, paper and film scanners.

The output of the semiconductor imager is an analog signal with four distinct "zones" of information. These zones, illustrated in FIG. 1, are characterized as reset, back porch, transition and video. The analog output of a semiconductor imager requires a sample and hold circuit to extract a more accurate representation of the video signal. Typically the sample and hold circuit is applied to the analog output of the semiconductor imager, before an analog to digital conversion can be performed. In these circuits the analog output of the semiconductor imager is the input to the sample and hold circuit. This signal is labeled $V_{in}$ in FIG. 1 and displays the format of the video signal received from the image sensor. Sample and hold techniques that are applied digitally exist within the prior art. Such a teaching exists within U.S. Pat. 5,086,344 issued to D'Luna et. al, which is commonly assigned with present invention. However, both analog and digital teachings within the prior art discuss voltage level adjustments rather than phase adjustment.

In most systems two sample and holds are used; one to clamp the "back porch" ($V_{off}$) and a second to sample the video ($V_{sig}$). These signals are subtracted to derive a more accurate video signal in what is often called Correlated Double Sampling (CDS). A larger magnitude difference indicates that more light has been detected.

A reset signal is used by the output stage of the imager to dump the charge associated with the previous output. This reset signal is capacitively coupled to the video output and typically leaves an artifact in the form of a positive pulse. For a CCD this pulse would be on the order of 100–600 mV ($V_{rst}$). The rising edge of this pulse terminates the current output and the falling edge starts the next output.

Current art uses a single timing generator to create the reset, clamp and sample signals with the correct phase relationship to the analog video signal. There are timing requirements for minimum sample to reset delays, and reset to clamp delays. The system tolerance is typically added to these delays to guarantee that these requirements are met. This cumulative timing requirement typically results in a reduction of duty cycle for the clamp and sample pulses. Smaller pulses make it more difficult for the sample and holds to acquire the signals.

A typical system would have four separate ICs. If the propagation delay through each chip was known, the system could be designed to generate the proper phase relationship between the CDS pulses and the analog video. The problem is that the propagation delay is not constant between batches of chips, or over time and temperature.

The majority of the timing uncertainty occurs at the interfaces between chips. Each chip crossing might contribute a 5 ns uncertainty. For three chip crossings, this would correspond to a total of 15 ns worst case skew between the clamp sample pulses and the analog video. In fast systems the skew may be a significant portion of the total timing budget. At a pixel output rate of 20 mhz, the sample window ($T_{sa}$) would be 50 ns/4 or 12.5 ns. If the system skew were 15 ns, it would be impossible to build the system with the ability to properly adjust the signal delays in the system.

Tapped analog or digital delay lines could be used to delay the analog $V_{in}$ or the digital clamp and sample pulses in the system. However, these delay line based systems require that various levels of calibration be performed. The level of calibration could easily vary and the calibration process would increase manufacturing cost and would not necessarily adapt to system variations resulting from temperature fluctuations and the aging process of the system.

If the sample pulse is not in the correct phase with the analog $V_{in}$, the sample and hold will acquire the signal on a sloping zone of $V_{in}$ making the video signal extremely sensitive to clock jitter. Delay errors can greatly decrease the signal amplitude and make the system non-linear.

It should be apparent from the foregoing discussion that there remains a need in the art for devices and methods that will apply sample pulses to imager output signals in a manner that maintains proper phase relationships. This and other shortcomings within the prior art are addressed by the teachings of the present invention.

SUMMARY OF THE INVENTION

The present invention is directed to overcoming one or more of the problems set forth above. Briefly summarized, according to one aspect of the present invention, by identifying the artifact of the reset signal from the output of the semiconductor imager, $V_{in}$, which is input into a correlated double sampling unit, CDS, it is possible to create sample and clamp clock signals that have the ideal phase relationship to $V_{in}$. The identified reset pulse is then used to synthesize the CDS clocks or to modify existing CDS clocks.

By implementing this reset signal identification and CDS clock generation on the same integrated circuit, all chip crossings associated with tolerance build up are removed. This has the added benefit of reducing by two the required number of interface pins between the CDS and the timing generator, potentially reducing package costs.

These and other aspects, objects, features and advantages of the present invention will be more clearly understood and appreciated from a review of the following detailed description of the preferred embodiments and appended claims, and by reference to the accompanying drawings.

Advantageous Effect Of The Invention

The present invention has the following advantages over the prior art: (1) it minimizes tolerance buildup on timing of the CDS clocks which results in easing system timing requirements; (2) it reduces the number of pins required to interface the timing generator to CDS by two pins; (3) it maximizes the video signal level by generating more accurate CDS clocks which results in higher speed operation; and (4) allows for wider clamp and sample clocks due to the minimized skew that is provided for by the present invention.

BRIEF DESCRIPTION OF THE DRAWINGS

FIG. 1 is a diagram showing a sample of the window used in timing the video output from a semiconductor imager;

FIG. 2 is a diagram of a differentiator as employed by the preferred embodiment;

FIG. 3 is a block diagram of a CCD based imaging system with Correlated Double Sampling;

FIG. 4 is a diagram of a Correlated Double Sampling clock synthesis system as envisioned by the present invention;

FIG. 5 is a block diagram illustrating the usage of a phase lock loop as envisioned by the present invention; and FIG. 6 is a diagram of an embodiment similar to that of FIG. 5 incorporating clock synthesis features on the phase lock loop.

To facilitate understanding, identical reference numerals have been used, where possible, to designate identical elements that are common to the figures.

DETAILED DESCRIPTION OF THE INVENTION

It has been discovered that the Reset Pulse within a video signal from a semiconductor imager can be identified through artifact within the video signal and used to provide a very exact phase relationship in sampling and clamping the video signal.

Referring to FIG. 1, which is a timing diagram for a typical video signal, generally referred to as $V_{in}$ 11, that is output from an image sensor, there are several ways of identifying the reset pulse 12 from the $V_{in}$ 11 signal shown in FIG. 1. It should be understood that the image sensor employed could be a charge coupled device as well as a CMOS base image sensor, or any image sensor having an analog output. There is reset artifact that exists only on the rising edge in the $V_{in}$ 11 signal. By acquiring this reset artifact, it is possible to establish the proper phase relationship between the input signal, $V_{in}$ 11, and the sample and hold circuit. A circuit as shown in FIG. 2, known as a differentiator 21, could be used to generate a pulse on this rising edge of the video signal, $V_{in}$ 11. The output from the image sensor is used as the input signal $V_{in}$ 11, and filtered through capacitor, C1, and resistor, R1, prior to being input into differentiator 21. The difference between the filtered $V_{in}$ 11 and a reference voltage level, $V_{ref}$ 12, is magnified according to the parameters of differentiator 21. Capacitor, C2, and resistor, R2, provide the proper biasing for the correct feedback from the output of the differentiator 21 to the input of the filtered version of $V_{in}$ 11. This is the most preferred method envisioned by the present invention of identifying the rising edge of video signal $V_{in}$.

Other sample and hold techniques are also envisioned by the present invention. Here, a comparator could be used to compare $V_{in}$ to the CCD pedestal voltage ($V_{off}$) if known, however the pedestal voltage is not always known. Referring to FIG. 2, which is a derivation of the comparator technique, if the clamping voltage, $V_{clamp}$, were used instead of $V_{in}$, the comparison method could be simplified by comparing the clamping voltage $V_{clamp}$ to the known $V_{ref}$. This would only synthesize the sample but not the clamp pulse. Another method would be to take the $V_{in}$ level and compare it to an offset. Either a fixed voltage or a peak detector with a predetermined voltage removed from the peak detector as an approximation to $V_{off}$.

FIG. 3 is a block diagram of the various operations performed in a Correlated Double Sampling (CDS) System, generally referred to as 30. Here, CCD 32 receives incident light and outputs an analog video signal, $V_{in}$ 11, to the CDS unit 34. A level shifter 31 will apply proper levels of reset and phase shift signal from the timing generator 35. The timing generator 35 will also supply clamp 21 and sample 22 signals to the CDS unit 34. The CDS unit 34 will output the corrected video signal to the analog to digital converters (A/D). It should be understood that the CDS 34 could be performed in digital rather than analog as shown in FIG. 3. In such a case that A/D would be performed prior to data reaching the CDS 34. It is also envisioned that such an embodiment could be performed with a digital PLL rather than an analog PLL.

Referring now to FIG. 4, which is a diagram of a Correlated Double Sampling clock synthesis system, generally referred to as 40, as envisioned by the present invention. Complete CDS clock synthesis 40 can be performed by a phase lock loop (PLL) 42 used to multiply the identified reset clock (as discussed above and generally referred to as sync 43) by a factor of four or more. Other methods of multiplying the frequency of the sync signal are also envisioned. Among these would be Fuzzy Logic Controllers as well as various digital techniques. However the preferred embodiment employs phase lock loop technology because it employs more readily available technology. Since the sync pulse 43 has a duty cycle of $\leq 25\%$, it may be necessary to divide the sync pulse 43 frequency by two using a toggle flip-flop to create a 50% duty cycle signal for the PLL 42. Employing an analog device such as PLL 42 will typically generate a clock signal which is within 0.5 ns of being completely in phase with the extracted reset clock. The PLL could be implemented in analog (phase discriminator and voltage controlled oscillator) or in digital using a base clock that has a higher frequency than the reset clock and phase resink technique to generate pulses that would effectively divide the frequency of the reset clock.

FIG. 5 is a block diagram of a phase lock loop based embodiment using off the shelf devices to create the phase lock loop (PLL) 42 as shown in FIG. 4. The phase lock loop 42 typically will contain a voltage controlled oscillator (VCO) 51, a phase discriminator 52, a prescaler 53 and a filter 54. The VCO will multiply its input by a factor of four. Prescaler 53 will divide the clock received from the VCO 51 by a factor of four. This divided clock is then input into the phase discriminator 52 along with the occurrence data related to the reset pulse from the reset identification 41. The phase discriminator 52 will properly adjust the phase relationship of the divided clock received from the prescaler 53, typically such that a rising edge of the divided clock will occur simultaneously with that of the identified rest signal. Filter 54 integrates the output of the phase discriminator 52 such that an average value of the output of the phase discriminator 52 is achieved. The filtered signal is then placed within VCO 51 which multiplies the signal by four to properly identify the quadrant of the video signal, $V_{in}$, input into clock generator 59, as previously discussed. In this manner unity is maintained by the phase lock loop. Employing off the shelf devices requires a separate phase lock loop 42 and clock generator 59.

Higher integration is desirable for the aforementioned reasons, including facilitating higher pixel readout rates. Referring to FIG. 6, which is a block diagram of the system employing the most preferred method of the present invention, that having phase lock loop (PLL), indicated by dotted line 142, integrated within the same device as the clock generator. The sample, clamp and sync signals are then all generated by the clock generator and prescaler unit 153. The remaining units within phase lock loop 142 perform the same functions as those previously discussed for FIG. 6.

If complete CDS clock synthesis is to be performed, either the sync pulse 43 or the output from the prescaler 53 is used as to indicate the start of a new pixel. If the reset (sync 43) frequency is multiplied by a factor of 4 (as shown in FIG. 1), the first (next) clock would be used to generate the clamp pulse and the third clock would be the sample pulse.

If only clock tuning is to be performed, the unmodified clamp and sample pulses are input to the clock generation block and the reset pulse is used to delay the start of the clamp pulse and to terminate early the sample pulse. This could be done by simply performing a logical AND of the clamp and sample pulses with the inverted reset pulse.

The sampling of $V_{in}$ to generate the video signal may be done using a single sample and hold if the added accuracy of CDS is not required. There are many published methods for implementing sample and holds, all of which could be used in this system. Some notable styles are open loop, closed loop, FET switch and diode bridge.

The invention has been described with reference to a preferred embodiment. However, it will be appreciated that variations and modifications can be effected by a person of ordinary skill in the art without departing from the scope of the invention.

| Parts List: | |
|---|---|
| 10 | timing for typical clamping and sampling of a video signal. |
| 11 | $V_{in}$, output from the semiconductor imager |
| 12 | $V_{ref}$, reference voltage for the reset identification |
| 20 | correlated double sampling circuit |
| 21 | clamp signal |
| 22 | sample signal |
| 30 | CCD system using correlated double sampling |
| 31 | level shifter |
| 32 | CCD |
| 34 | CDS unit |
| 35 | timing generator |
| 40 | Correlated double sampling clock synthesis |
| 41 | reset identification |
| 42 | phase lock loop |
| 43 | sync |
| 45 | clock generator |
| 51 | voltage controlled oscillator |
| 52 | phase discriminator |
| 53 | prescaler |
| 54 | filter |
| 59 | clock generator |
| 153 | clock generator and prescaler |

What is claimed is:

1. A circuit for generating control signals comprising:

an image sensing device capable of converting light into an image-bearing signal representative of light incident upon the image sensing device, the image sensing device including means for transferring the image-bearing signal representative of light incident upon the image sensing device upon application of a clock stimulus;

a clock generator for applying the clock stimulus to the image sensing device;

a reset signal for resetting the image sensing device to a predetermined potential;

synthesis means for generating a plurality of synthesized clocks to be employed for a sampling circuit, at least one of the synthesized clocks being responsive to the reset signal being applied of the image device resulting in an output from the image sensing device, the synthesis means further comprising a phase delay within the at least one synthesized clock that is applied to the sampling circuit that synchronizes a predetermined threshold in the output from the image sensing device with a corresponding portion of the reset signal; and means for sampling the image-bearing electronic signal in response to the sample pulse applied to the sampling circuit.

2. The apparatus of claim 1 wherein the synthesis means further comprises a phase-lock loop that synthesizes a pulse train used for generating the synthesized clocks.

3. The apparatus of claim 2 wherein the phase-lock loop maintains phase relationships between the synthesized clocks.

4. The apparatus of claim 2 further comprising a phase delay within the phase lock loop.

5. The apparatus of claim 2 wherein the phase-lock loop employs a Fuzzy logic controller.

6. The apparatus of claim 1 wherein the synthesis means is responsive to the image-bearing signal.

7. The apparatus of claim 1 wherein the synthesis means is responsive to a plurality of outputs from the clock generator.

8. The apparatus of claim 1 wherein the synthesis means is responsive to a clock which is generated by the image sensing device.

9. The apparatus of claim 1 wherein the image sensing device is a charge coupled device.

10. The apparatus of claim 1 wherein the synthesis means is responsive to a reset signal.

11. The apparatus of claim 1 wherein the synthesis means is responsive to a horizontal clock signal.

12. The apparatus of claim 1 wherein the means for sampling the image-bearing electronic signal further comprises means for performing a correlated double sampling.

13. The apparatus of claim 12 wherein the synthesis means further comprises means for generating a sample clock for sampling the image-bearing electronic signal and a clamping signal for generating a signal intended to capture a portion of the image-bearing electronic signal.

14. The apparatus of claim 1 wherein means for sampling the image-bearing electronic signal further comprises an analog to digital converter.

15. The apparatus of claim 14 wherein the analog to digital converter further comprises a convert input that identifies portions of the image-bearing electronic signal are to be parsed into discrete units under control of a convert clock from the synthesis means.

* * * * *